United States Patent
Biskeborn et al.

(10) Patent No.: US 12,374,358 B2
(45) Date of Patent: Jul. 29, 2025

(54) TAPE HEADS HAVING TIERED SERVO READERS

(71) Applicant: Western Digital Technologies, Inc., San Jose, CA (US)

(72) Inventors: Robert G. Biskeborn, Hollister, CA (US); David J. Seagle, Morgan Hill, CA (US); Diane L. Brown, San Jose, CA (US); Trevor W. Olson, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/230,048

(22) Filed: Aug. 3, 2023

(65) Prior Publication Data

US 2025/0006223 A1    Jan. 2, 2025

Related U.S. Application Data

(60) Provisional application No. 63/524,423, filed on Jun. 30, 2023.

(51) Int. Cl.
G11B 5/55    (2006.01)

(52) U.S. Cl.
CPC .................................. G11B 5/5526 (2013.01)

(58) Field of Classification Search
None
See application file for complete search history.

(56) References Cited

U.S. PATENT DOCUMENTS

| 5,488,525 | A   | * | 1/1996  | Adams | G11B 5/00878 |
| 6,005,737 | A   | * | 12/1999 | Connolly | G11B 5/584 |
|           |     |   |         |        | 360/75 |
| 6,424,499 | B1  |   | 7/2002  | Balakrishnan et al. | |
| 6,606,216 | B1  |   | 8/2003  | Liikanen et al. | |
| 6,914,744 | B1  |   | 7/2005  | Wang | |
| 6,992,857 | B2  | * | 1/2006  | Knowles | G11B 5/584 |
| 7,054,093 | B1  | * | 5/2006  | Anderson | G11B 5/00826 |
| 8,045,290 | B2  |   | 10/2011 | Mckinstry et al. | |
| 8,988,817 | B1  |   | 3/2015  | Cherubini et al. | |

(Continued)

OTHER PUBLICATIONS

Cherubini, Giovanni et al., "Fast servo signal acquisition in tape drives using servo and data channels", Elsevier, 2012, pp. 349-360.

*Primary Examiner* — William J Klimowicz
(74) *Attorney, Agent, or Firm* — PATTERSON + SHERIDAN, LLP

(57) ABSTRACT

The present disclosure generally relates to a tape drive comprising one or more tape head modules. Each tape head module comprises 65 data elements disposed in a first row, each data element being a write element or a read element, and at least 5 servo element pairs disposed in a second row, the second row being disposed parallel to the first row. The second row is spaced a distance in a first direction from the first row. One or more data elements and one or more servo element pairs may be unwired and non-operable. The tape drive may comprise three tape head modules, where the second tape head module is disposed between the first and third tape head modules. Each data element of the first tape head module and the third tape head module are write elements, and each data element of the second module is a read element.

19 Claims, 9 Drawing Sheets

(56) References Cited

U.S. PATENT DOCUMENTS

| | | | |
|---|---|---|---|
| 9,177,571 B2 | 11/2015 | Cherubini et al. | |
| 9,978,411 B1* | 5/2018 | Biskeborn | G11B 20/1201 |
| 10,199,060 B2* | 2/2019 | Biskeborn | G11B 5/531 |
| 10,269,378 B1 | 4/2019 | Miyamura et al. | |
| 10,453,484 B2* | 10/2019 | Biskeborn | G11B 20/1201 |
| 11,114,117 B1 | 9/2021 | Seagle et al. | |
| 11,817,137 B1* | 11/2023 | Biskeborn | G11B 5/5926 |
| 11,894,030 B2* | 2/2024 | Biskeborn | G11B 5/00813 |
| 12,087,336 B1* | 9/2024 | Biskeborn | G11B 5/00813 |
| 2005/0168865 A1* | 8/2005 | Simmons | G11B 5/4976 |
| 2009/0174963 A1* | 7/2009 | Liang | G11B 5/584 |
| | | | 360/77.12 |
| 2009/0213493 A1* | 8/2009 | Bui | G11B 5/584 |
| | | | 360/110 |
| 2009/0268339 A1 | 10/2009 | Trabert et al. | |
| 2010/0177436 A1* | 7/2010 | Bui | G11B 5/584 |
| 2016/0232936 A1 | 8/2016 | Poorman et al. | |
| 2016/0372142 A1 | 12/2016 | Biskeborn et al. | |
| 2018/0268849 A1* | 9/2018 | Biskeborn | G11B 5/4893 |
| 2018/0268850 A1* | 9/2018 | Biskeborn | G11B 5/00813 |
| 2019/0214043 A1* | 7/2019 | Biskeborn | G11B 20/1201 |
| 2019/0214044 A1* | 7/2019 | Biskeborn | G11B 20/1201 |
| 2019/0214045 A1* | 7/2019 | Biskeborn | G11B 5/4893 |
| 2019/0214046 A1* | 7/2019 | Biskeborn | G11B 20/1201 |
| 2019/0214047 A1* | 7/2019 | Biskeborn | G11B 5/00813 |
| 2019/0362747 A1* | 11/2019 | Biskeborn | G11B 5/4893 |
| 2019/0362748 A1* | 11/2019 | Biskeborn | G11B 5/00813 |
| 2019/0362749 A1* | 11/2019 | Biskeborn | G11B 5/00813 |
| 2022/0319540 A1* | 10/2022 | Biskeborn | G11B 5/00813 |
| 2023/0267964 A1* | 8/2023 | Biskeborn | G11B 5/584 |
| 2023/0419992 A1* | 12/2023 | Biskeborn | G11B 5/4893 |

* cited by examiner

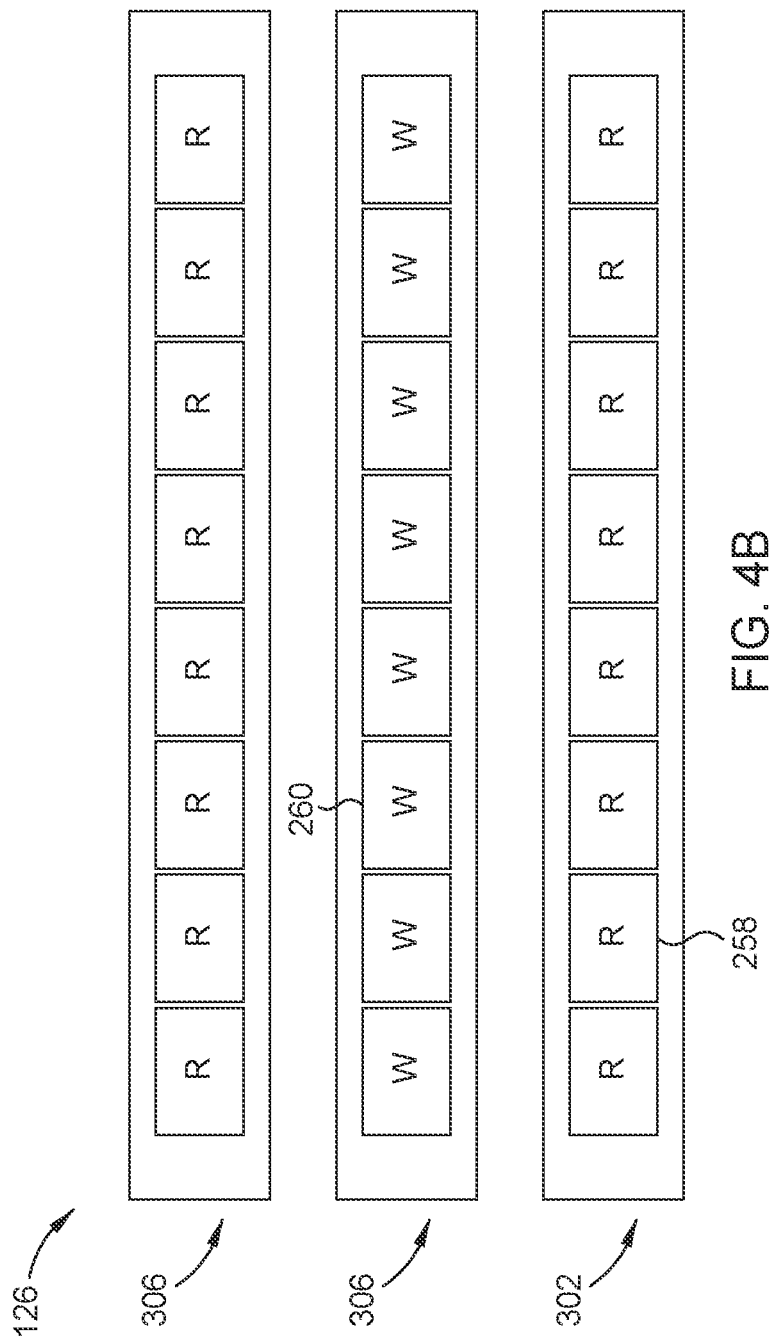

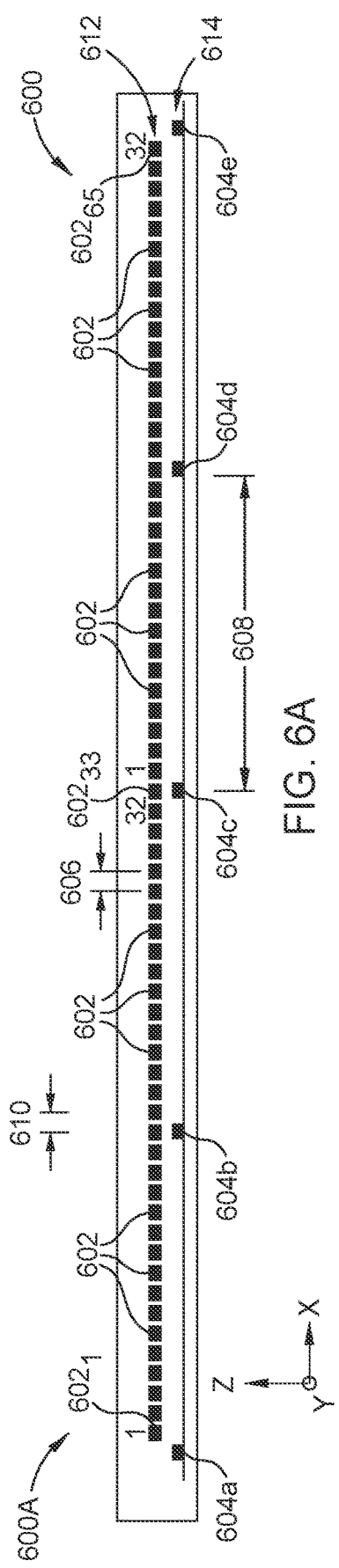
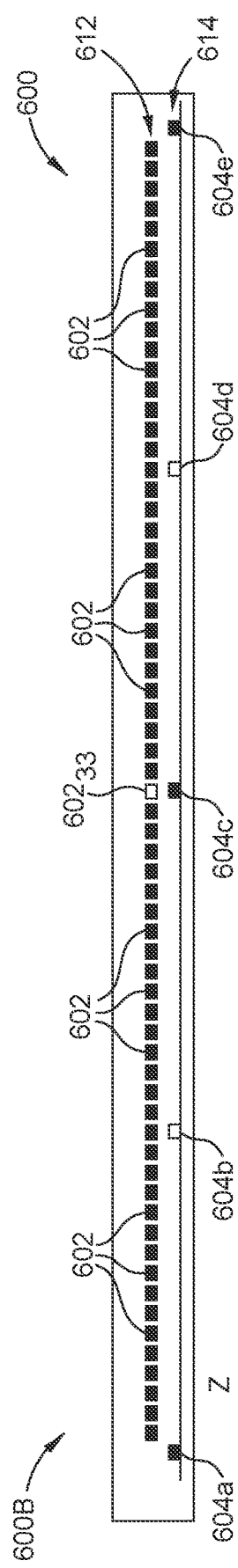
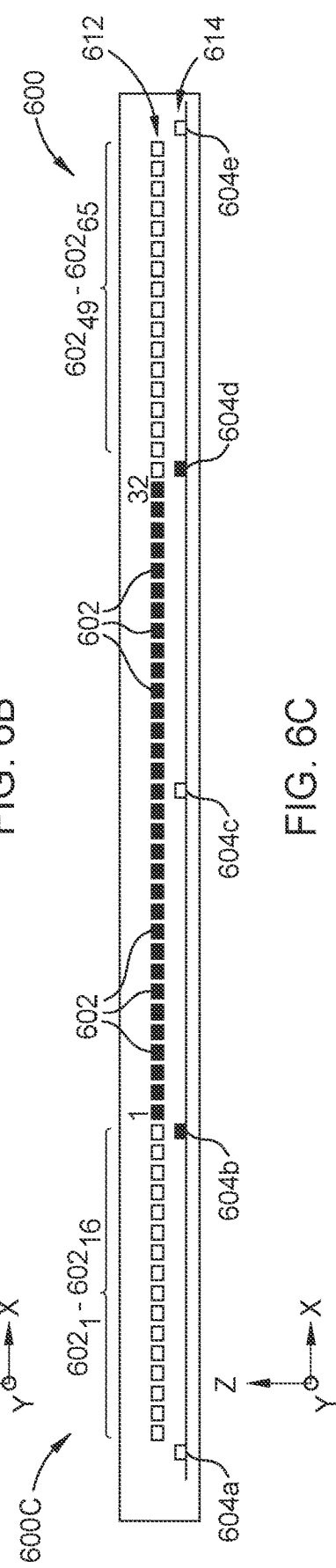
FIG. 6A
FIG. 6B
FIG. 6C

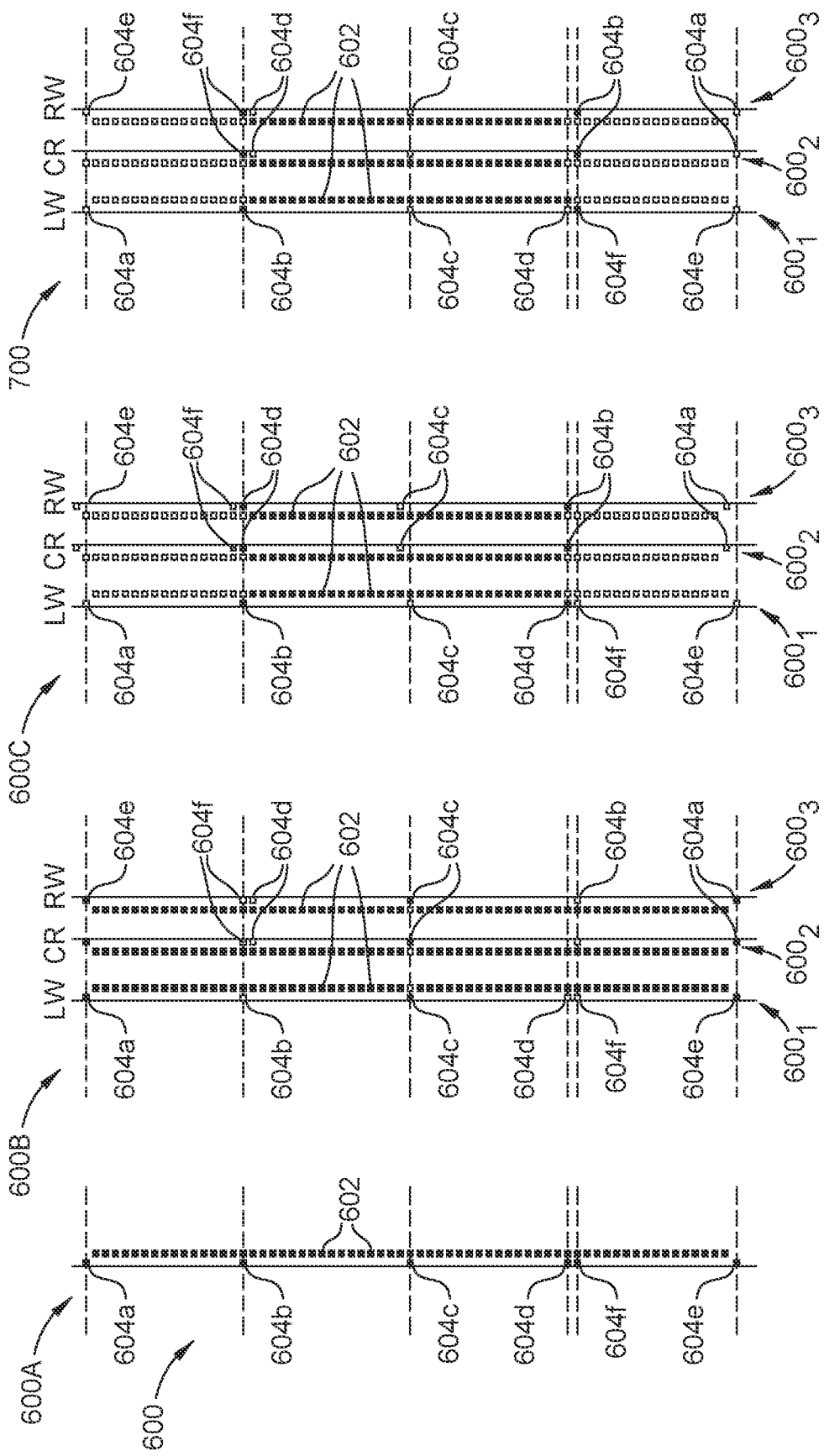

TAPE HEADS HAVING TIERED SERVO READERS

CROSS-REFERENCE TO RELATED APPLICATIONS

This application claims benefit of U.S. provisional patent application Ser. No. 63/524,423, filed Jun. 30, 2023, which is herein incorporated by reference.

BACKGROUND OF THE DISCLOSURE

Field of the Disclosure

Embodiments of the present disclosure generally relate to a tape head module and a tape drive including the tape head module.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

Tape drives generally come in two sizes, a full-high drive and a half-high drive. Due to the smaller size of the half-high drive, the half-high drive is generally more popular than the full-high drive, as the overall footprint of the half-high drive is smaller. The half-high drive is smaller height-wise than the full-high drive, which limits the amount of data elements and servo element pairs that can be utilized to write and read data, as there is no room for more than 32 data elements to be wired and functional. Thus, the half-high drive is only capable of writing 32 channels or data tracks of a tape at a time. The full-height drive is not subject to this limitation and thus, can support increasing the number of concurrent channels to 64 channels or higher. However, there is a need that full-height and half-height drives must both write and read the same identical 32 channel format, meaning that the tapes so written in either drive are fully interchangeable for both write append and reading operations in both drives.

Due to head design and format constraints, there is a need for a tape drive that enables that aforementioned requirements.

SUMMARY OF THE DISCLOSURE

The present disclosure generally relates to a tape drive comprising one or more tape head modules. Each tape head module comprises 65 data elements disposed in a first row, each data element being a write element or a read element, and at least 5 servo element pairs disposed in a second row, the second row being disposed parallel to the first row. The second row is spaced a distance in a first direction from the first row. One or more data elements and one or more servo element pairs may be unwired and non-operable. The tape drive may comprise three tape head modules, where the second tape head module is disposed between the first and third tape head modules. Each data element of the first tape head module and the third tape head module are write elements, and each data element of the second module is a read element.

In one embodiment, a tape head module comprises 65 data elements disposed in a first row, each data element being a write element or a read element, and at least 5 servo element pairs disposed in a second row, the second row being disposed parallel to the first row, wherein the second row is spaced a distance in a first direction from the first row.

In another embodiment, a tape drive comprises a first tape head module, the first tape head module comprising: 65 data elements disposed in a first row, each data element being a write element or a read element, wherein one or more data elements of the 65 data elements are unwired, and at least 5 servo element pairs disposed in a second row, the second row being disposed parallel to the first row, wherein the second row is spaced a first distance in a first direction from the first row, wherein one or more servo element pairs of the at least 5 servo element pairs are unwired, and wherein at least 2 of the at least 5 servo element pairs are spaced a second distance of at least one-fifth of a distance that spans the first row of 65 data elements from an adjacent servo element pair.

In yet another embodiment, a tape drive comprises a first tape head module, a second tape head module disposed adjacent to the first tape head module, and a third tape head module disposed adjacent to the second tape head module, wherein the first tape head module, the second tape head module, and the third tape head module each individually comprises: 65 data elements disposed in a first row, each data element being a write element or a read element, wherein one or more data elements of the 65 data elements are unwired, and at least 5 servo element pairs disposed in a second row, the second row being disposed parallel to the first row, wherein the second row is spaced a first distance of about 0.5 μm to about 2 μm in a first direction from the first row, wherein one or more servo element pairs of the at least 5 servo element pairs are unwired, and wherein each servo element pair is spaced a second distance of at least one-fifth of a distance that spans the first row of 65 data elements from an adjacent servo element pair.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B illustrate various configurations for the first, second and third modules of FIG. 3.

FIGS. 6A-6C illustrate a tape head module, according to various embodiments.

FIGS. 7A-7D illustrate various configurations of the tape head module 600 of FIGS. 6A-6C, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive comprising one or more tape head modules. Each tape head module comprises 65 data elements disposed in a first row, each data element being a write element or a read element, and at least 5 servo element pairs disposed in a second row, the second row being disposed parallel to the first row. The second row is spaced a distance in a first direction from the first row. One or more data elements and one or more servo element pairs may be unwired and non-operable. The tape drive may comprise three tape head modules, where the second tape head module is disposed between the first and third tape head modules. Each data element of the first tape head module and the third tape head module are write elements, and each data element of the second module is a read element.

Figure 1A:
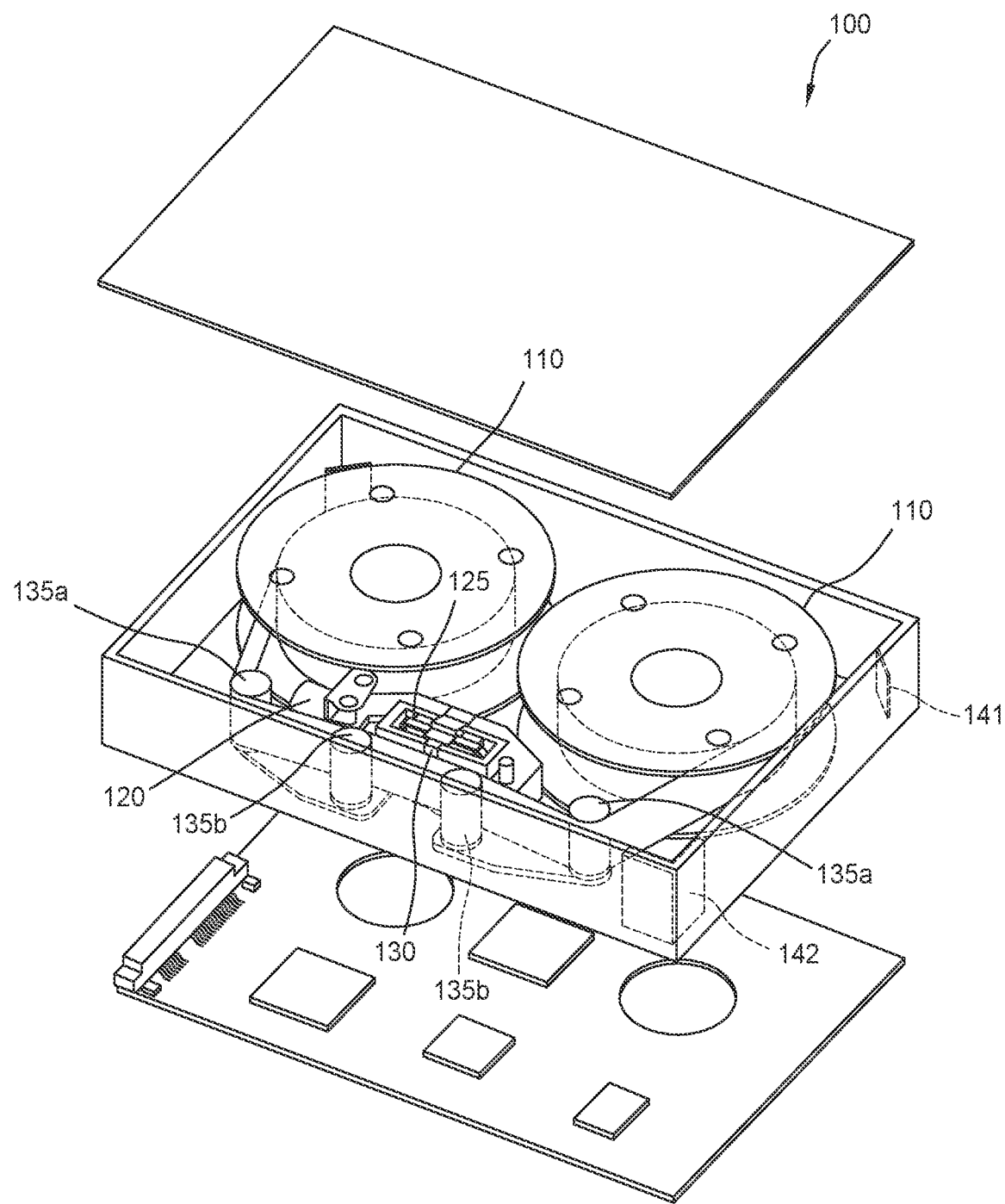
FIGS. 1A-1C illustrate a perspective exploded view, a simplified top down, and side profile view of a tape drive, in accordance with some embodiments.
Figure 1B:
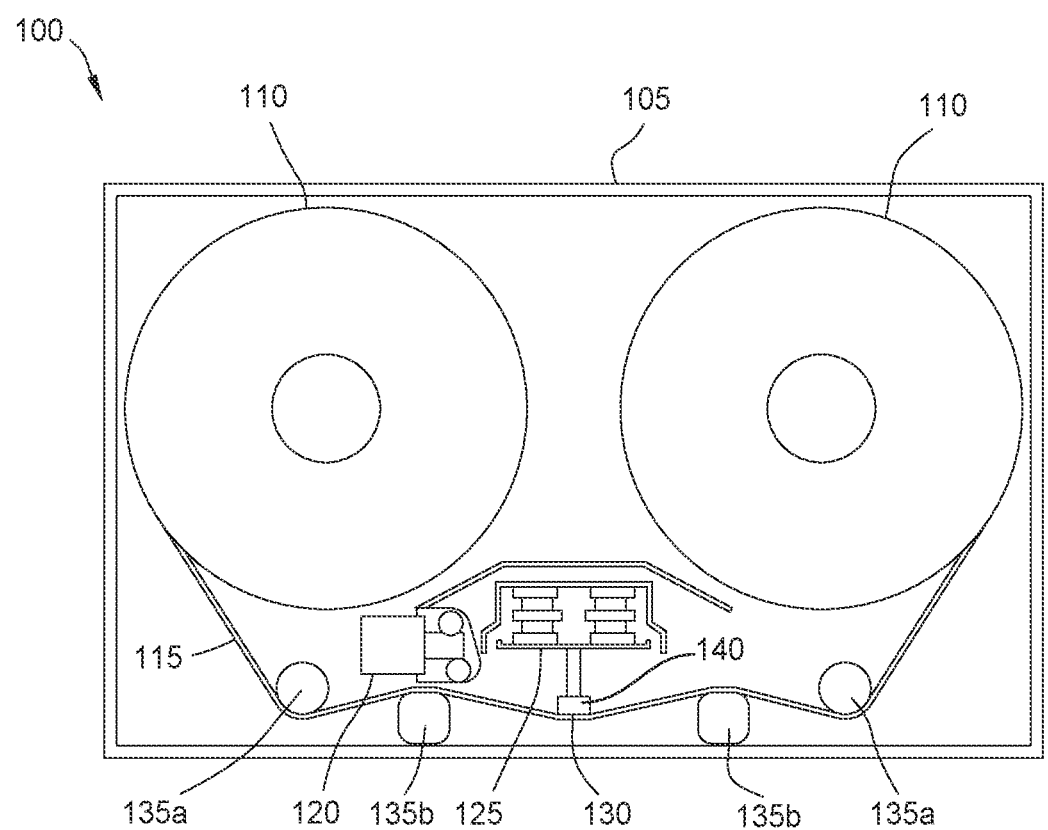
Figure 1C:
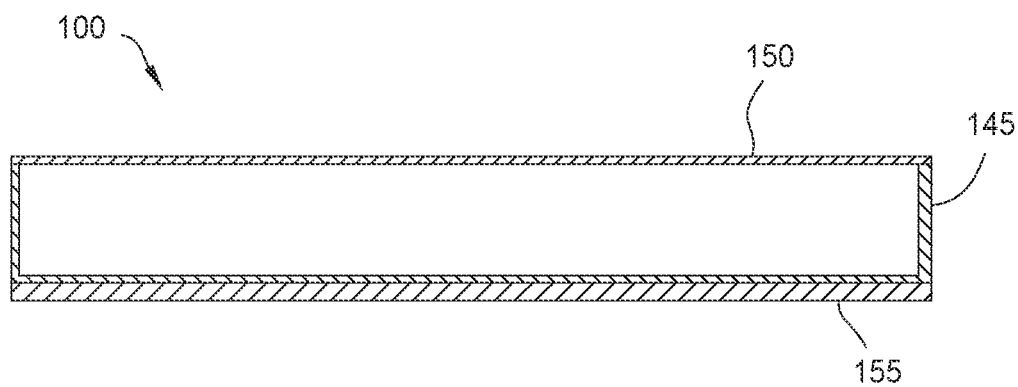

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
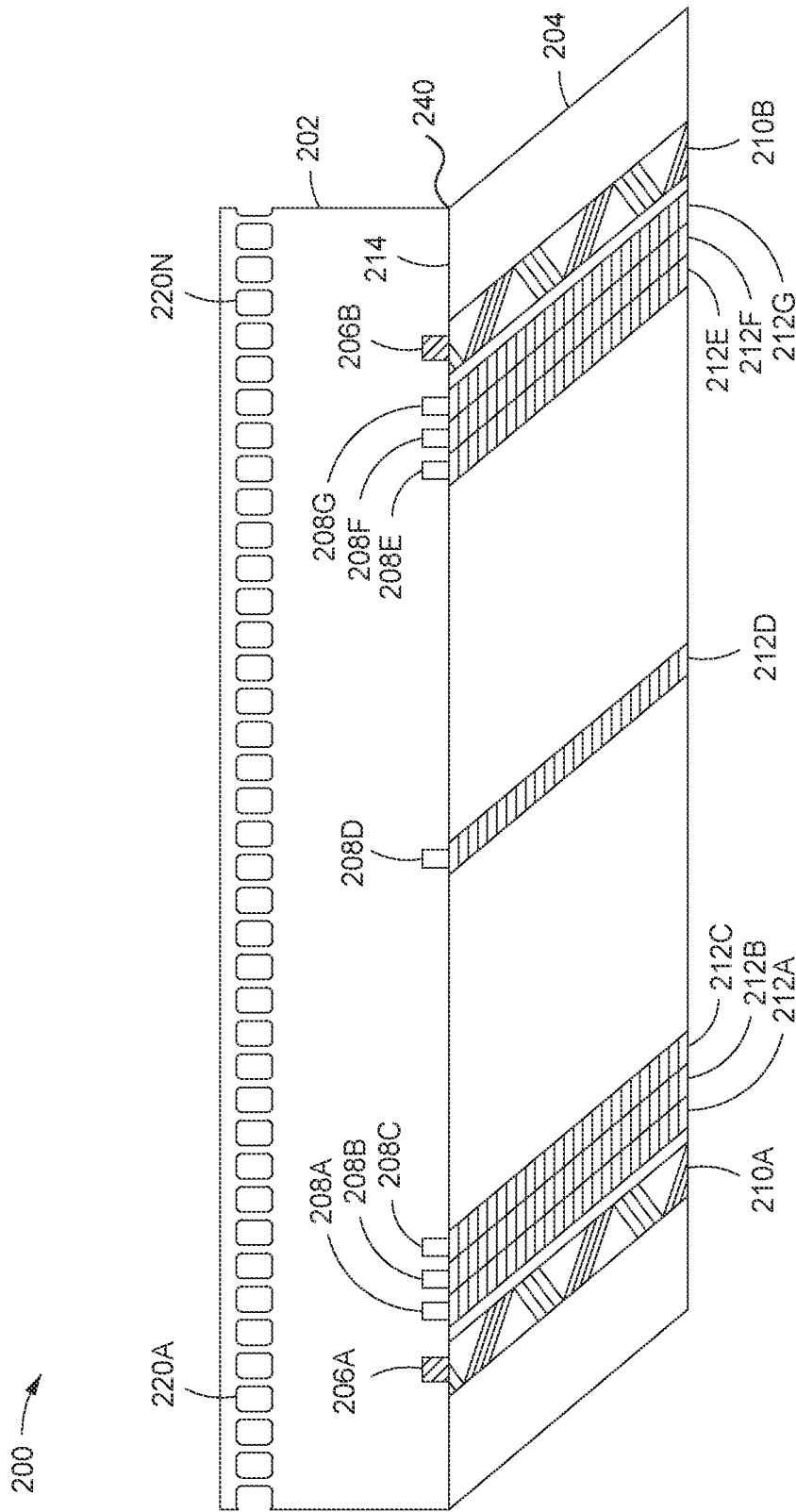
FIG. 2 is a schematic illustration of a tape head and tape that are aligned.

FIG. 2 is a schematic illustration of a tape head module assembly 200 and a tape 204 that are aligned. The tape head module assembly 200 comprises a tape head body 202 that is aligned with the tape 204. The tape 204 moves past the tape head module assembly 200 during read and/or write operations. The tape head module assembly 200 has a media facing surface (MFS) 214 that faces the tape 204. The tape head module assembly 200 is coupled to a controller, which may be the controller 140 of FIG. 1.

The tape head body 202 comprises a first servo element pair 206A and a second servo element pair 206B spaced therefrom. It is to be understood that while two servo element pairs have been shown, the disclosure is not limited to two servo element pairs. Rather, it is contemplated that more or less servo element pairs may be present. A plurality of data heads 208A-208G is disposed between the first servo element pair 206A and the second servo element pair 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo element pairs 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo element pair 206A reads its lateral position information (e.g., alignment) over the first servo track 210A. The second servo element pair 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo element pair 206A, the second servo element pair 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
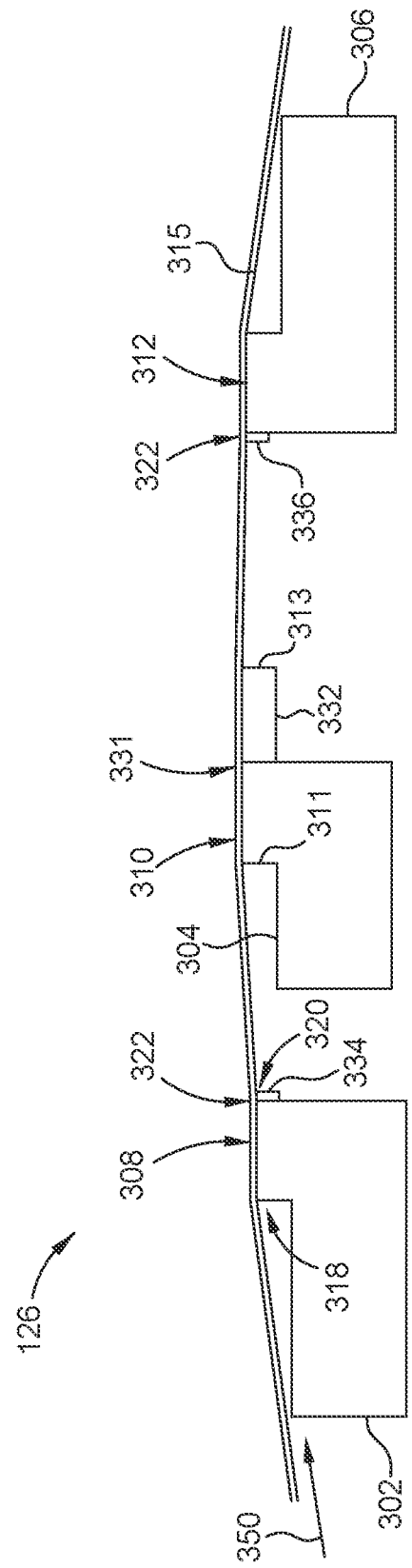
FIG. 3 illustrates a magnetic recording head according to one approach of the present invention that includes first, second and third modules each having a media facing surface, respectively, which may be flat, contoured, etc.
Figure 4A:
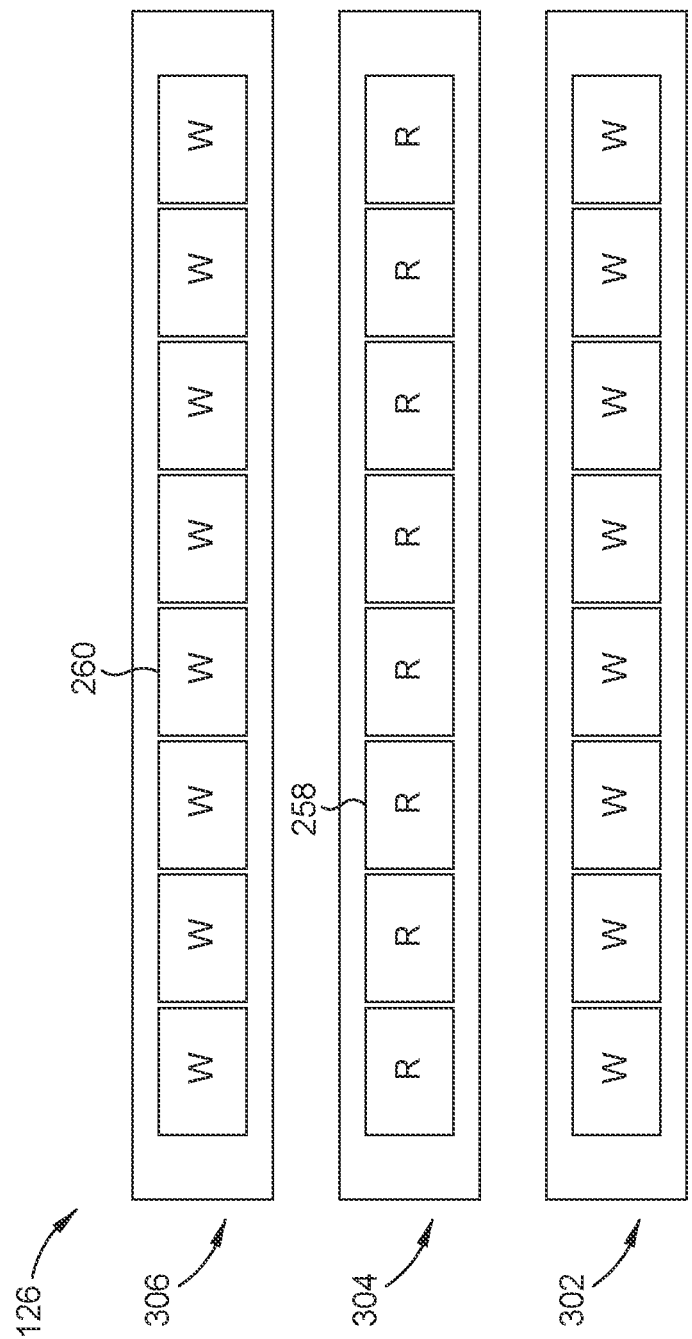

FIG. 3 illustrates a magnetic recording head 126 according to one approach of the present disclosure that includes first, second and third modules 302, 304, 306 each having a media facing surface 308, 310, 312 respectively, which may be flat, contoured, etc. FIGS. 4A-4B illustrate various configurations for the first, second and third modules 302, 304, 306 of FIG. 3.

For explanation purposes, the first module 302, or the leading module 302, is the first module encountered by the tape 315 in a three module design for tape 315 moving in the indicated direction by arrow 350. The third module 306, or the trailing module 306, follows the middle module 304 and is the last module seen by the tape 315 in a three module design. The leading and trailing modules 302, 306 are referred to collectively as outer modules. Also note that the outer modules 302, 306 will alternate as leading modules, depending on the direction of travel of the tape 315.

In a write-read-write (W-R-W) head, outer modules for writing flank one or more inner modules for reading. FIG. 4A illustrates a W-R-W configuration, the outer modules 302, 306 each include one or more arrays of writers (W) 260. The inner module 304 of FIG. 4A includes one or more arrays of readers (R) 258 in a similar configuration. Variations of a multi-module head include a R-W-R head, like shown in FIG. 4B, a R-R-W head, a W-W-R head, etc. In yet other variations, one or more of the modules may have read/write pairs of transducers. While each module comprises 8 readers 258 or 8 writers 260, each module may include a greater number of readers 258 and/or writers 260.

Writing and reading functions are performed by different modules at any given time. In one approach, the second module 304 includes a plurality of readers (such as the readers 258 of FIGS. 4A-4B) and optional servo readers 331 and no writers. The first and third modules 302, 306 include a plurality of writers 322 and no data readers, with the exception that the outer modules 302, 306 may include optional servo readers. The writers 322 may be the writers 260 of FIGS. 4A-4B. The servo readers may be used to position the head during reading and/or writing operations. The servo reader(s) on each module are typically located towards the end of the array of readers or writers.

In one approach, the media facing surfaces 308, 310, 312 of the first, second, and third modules 302, 304, 306 lie on about parallel planes, and the media facing surface 310 of the second module 304 is above the media facing surfaces 308, 312 of the first and third modules 302, 306. Such a configuration has the effect of creating the desired wrap angle of the tape 315 relative to the media facing surface 310 of the second module 304.

Where the media facing surfaces 308, 310, 312 lie along parallel or nearly parallel yet offset planes, a vacuum created by a skiving edge 318 of the leading module 302 is sufficient to keep the tape 315 adhered to the media facing surface 308 of the leading module 302. A trailing edge 320 of the leading module 302 (the end from which the tape 315 leaves the leading module 302) is the approximate reference point which defines a wrap angle over the media facing surface 310 on the leading edge 311 of the second module 304. The tape 315 stays in close proximity to the media facing surface 308 until close to the trailing edge 320 of the leading module 302. Accordingly, the writers 322 may be located near the trailing edges of the outer modules 302, 306.

Beneficially, the inner wrap angle on the leading edge 311 of the module 304 receiving the tape 315 will be larger than the inner wrap angle on the trailing edge 313, as the tape 315 rides above the trailing module 306. This difference is generally beneficial as a smaller inner wrap angle on the trialing edge 313 tends to oppose what has heretofore been a steeper exiting effective wrap angle.

The media facing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the media facing surface 312 so there is virtually no wear on the elements when tape is moving in this direction. Particularly, the tape 315 entrains air and so will not significantly ride on the media facing surface 312 of the third module 306 (some contact may occur). This is permissible, because the leading module 302 is writing while the trailing module 306 is idle.

As shown in FIG. 3, the first, second, and third modules 302, 304, 306 each have a closure 332, 334, 336, which extends the media facing surface of the associated module, thereby effectively positioning the read/write elements away from the edge of the media facing surface. In some aspects, the second module 304 has a closure, while the first and third modules 302, 306 do not have a closure. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used linear tape open (LTO) tape head spacing. The open space between the modules 302, 304, 306 can still be set to approximately 0.5 to 0.6 mm, which in some approaches is ideal for stabilizing tape motion over the second module 304.

Figure 5:
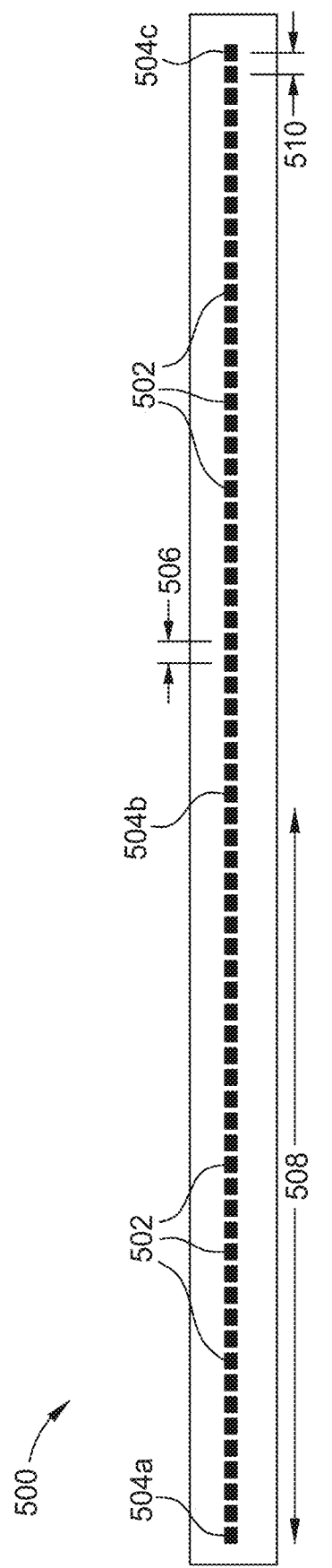
FIG. 5 illustrates a conventional tape head module.

FIG. 5 illustrates a conventional tape head module 500. The conventional tape head module 500 comprises 66 data elements 502 for writing 64 or 32 data tracks of a tape (not shown). Each data element 502 may both a write transducer (not shown) and a read transducer (not shown), only write transducers, or only read transducers, as discussed above. The tape head module 500 further comprises a first servo element pair or head 504a, a second servo element pair 504b, and a third servo element pair 504c. 33 data elements 502 are disposed between the first servo element pair 504a and the second servo element pair 504b, and 33 data elements 502 are disposed between the second servo element pair 504b and the third servo element pair 504c such that the second servo element pair 504b is centered on the tape head module 500. The data elements 502 and the pairs of servo elements 504a-504c are all linearly aligned or disposed in a same plane or row.

Each data element 502 is spaced a distance 506 of about 83.25 µm from an adjacent data element 502. The first servo element pair 504a is spaced a distance 510 of about 97.5 µm from the adjacent data element 502, the third servo element pair 504c is spaced the distance 510 from the adjacent data element 502, and the second servo element pair 504b is spaced the distance 510 from each adjacent data element 502. The first servo element pair 504a is spaced a distance 508 of about 2859 µm from the second servo element pair 504b, and the second servo element pair 504b is spaced the distance 508 from the third servo element pair 504c.

When writing to or reading data from a tape in a full-high tape drive, the tape head module 500 is capable of writing 64 data tracks at once. When writing to 64 data tracks, only 64 data elements 502 are used at a time. The two data elements 502 not in use varies depending on the location and alignment of the tape head module 500 over the tape. When writing to or reading data from a tape in a half-high tape drive, the tape head module 500 is capable of writing 32 data tracks at once. When writing to 32 data tracks, only 32 data elements 502 are used at a time, such as every other data element 502. Due to spacing constraints in a half-high tape drive, only 33 data elements 502 are properly wired to be functional, as the required electronics needed to wire the additional 33 data elements 502 are unable to fit within the half-high tape drive. The extra data element 502 not in use varies depending on the location and alignment of the tape head module 500 over the tape.

FIGS. 6A-6C illustrate a tape head module 600, according to various embodiments. In FIGS. 6A-7D, solid filled boxes denote elements that are wired and operational, while non-filled boxes denote elements that are fabricated in the wafers and the resulting head modules but not wired and operational. FIG. 6A illustrates a first wiring configuration 600A for the tape head module 600 where all 65 data elements 602 and 5 servo element pairs 604a-604e are wired and operational. FIG. 6B illustrates a second wiring configuration 600B for the tape head module 600 where 32 data elements 602 and 3 servo element pairs 604a-604e are wired and operational. FIG. 6C illustrates a third wiring configuration 600C for the tape head module 600 where 32 data elements 602 and 2 servo element pairs 604a-604e are wired and operational. While only one servo element 604 is shown for each servo element pair, the servo element pairs may comprise two or more servo elements, such as three servo elements, where the additional servo elements of the two or more are disposed adjacent in the second row 614. Within each servo element pair 604, the paired servo elements are spaced a distance of about 83.25 µm apart.

The tape head module 600 may be utilized within a tape drive comprising a controller, such as the captive tape drive or tape drive 100 of FIG. 1A. The tape head module 600 may be utilized with, or be a part of, the tape head module 200 of FIG. 2. The tape head module 600 may be utilized with, or be a part of, the magnetic recording head 126 of FIG. 3. While one tape head module 600 is shown, a magnetic recording head, such as the magnetic recording head 126 of FIG. 3, may comprise two or more tape head modules 600 arranged in any write and read configuration, such as discussed above in FIGS. 3-4B.

The tape head module 600 comprises 65 data elements 602 for writing/reading 64 or 32 data tracks of a tape (not shown). Each data element 602 may both a write transducer (not shown) and a read transducer (not shown), only write transducers, or only read transducers, as discussed above. The tape head module 600 further comprises a first servo element pair or head 604a, a second servo element pair 604b, a third servo element pair 604c, a fourth servo element pair 604d, and a fifth servo element pair 604e (collectively referred to herein as servo element pairs 604). The data elements 602 are disposed in a first row 612, and the servo element pairs 604 are disposed in a second row 614 parallel to the first row 612. The first row 612 and the second row 614 are offset in the z-direction by a distance of about 0.5 µm to about 2 µm.

The first servo element pair 604a is disposed adjacent to the first data element $602_1$ in the −x-direction, the second servo element pair 604b is aligned with the 16$^{th}$ data element 602, the third servo element pair 604c is aligned with the 33$^{rd}$ data element $602_{33}$, the fourth servo element pair 604d is aligned with the 49$^{th}$ data element 602, and the fifth servo element pair 604e is disposed adjacent to the 65$^{th}$ data element $602_{65}$ in the x-direction.

Each data element 602 is spaced a distance 606 of about 83.25 µm from an adjacent data element 602. Each servo element pair 604a-604e is spaced a distance 610 of about 83.25 µm from the adjacent data element(s) 602. However, in configurations where the tape head module is tilted, the distance 606 and the distance 610 may each individually be increased by up to about 7%. Each servo element pair 604a-604e is spaced a distance 608 of about 2740 µm to about 2760 µm, for example about 2747.25 µm, or at least one-fifth of a distance that spans the first row of 65 data elements, from the adjacent servo element pair(s) 604a-604e.

In the first wiring configuration 600A of FIG. 6A, all 65 data elements 602 and all 5 servo element pairs 604a-604e are wired and operable, for use, as an example, in a full-high drive. In such a configuration 600A, the tape head module 600 is capable of writing two 32 channel or two 32 data track bands (e.g., 64 channels or 64 data tracks of a tape) simultaneously, as noted by the 1-32, 1-32 numbering spaced by the 33$^{rd}$ data element $602_{33}$. Additionally, the tape head module 600 is further capable of writing one 32 channel or one 32 data track band using either the first set of data elements $602_1$ through $602_{33}$, or using the second set of data elements $602_{33}$ through $602_{65}$. Note that each set has 33 data elements, with one common data element between the sets, as one element will be selectively not used for reading/writing as described below. Due to the spacing between the data elements 602, 64 data elements 602 operate concurrently. The 64 data elements 602 vary depending on the location of the tape head module 600 over the tape. For example, when the tape head module 600 is disposed over the tape mostly in the −x-direction, the last or 65$^{th}$ data element $602_{65}$ may not be in use. When the tape head module 600 is centered over the tape, the middle or 33$^{rd}$ data element $602_{33}$ may not be in use. When the tape head module 600 is disposed over the tape mostly in the x-direction, the first data element $602_1$ may not be in use. By utilizing all 5 servo element pairs 604a-604e, accurate placement of the tape head module 600 over the tape is ensured, which may account for TDS effects.

The second wiring configuration 600B of FIG. 6B is similar to the first wiring configuration 600A; however, the 33$^{rd}$ data element $602_{33}$, the second servo element pair 604b, and the fourth servo element pair 604d are not wired or operable. In such a configuration, the tape head module 600 is capable of writing two 32 channel or two 32 data track bands (e.g., 64 channels or 64 data tracks of a tape) simultaneously. Additionally, the tape head module 600 is further capable of writing one 32 channel or one 32 data track band using either the first set of data elements $602_1$ through $602_{32}$, or using the second set of data elements $602_{34}$ through $602_{65}$.

In the third configuration 600C, only the central 32 data elements $602_{17}$ through $602_{48}$, the second servo element pair 604b and the fourth servo element pair 604d are wired and operable. The first third of data elements $602_1$ through $602_{16}$, the last third of data elements $602_{49}$ through $602_{65}$, the first servo element pair 604a, the third servo element pair 604c, and the fifth servo element pair 604e are not wired. As such, the tape head module 600 being wired in the third configuration 600C may be used, as an example, in a full-high tape drive or a half-high tape drive, where the tape head module 600 is capable of writing 32 channels or 32 data tracks at once (e.g., one band of a tape). Thus, even though the tape head 600 being wired in the third configuration comprises 65 data elements 602 and 5 servo element pairs 604a-604e, the tape head module 600 is wired similar to a 32 channel tape head module, allowing the tape head module 600 to function in a half-high drive, as the non-wired data elements 602 and non-wired servo element pairs 604a, 604c, 604e do not take up additional electronic space within the drive.

FIGS. 7A-7D illustrate various configurations of the tape head module 600 of FIGS. 6A-6C, according to various embodiments.

FIG. 7A illustrates the tape head module 600 comprising a sixth servo element pair 604f in the first configuration 6A, according to one embodiment. The sixth servo element pair 604f is disposed between the fourth and fifth servo element pairs 604d, 604e, and is disposed directly adjacent to the fourth servo element pair 604d. In FIG. 7A, all 71 elements 602, 604a-604f are wired and operational.

FIG. 7B illustrates three tape head modules $600_1$, $600_2$, $600_3$, each tape head module $600_1$, $600_2$, $600_3$ being in the second configuration 600B and may or may not comprise the optional sixth servo element pair 604f. In each of tape head module $600_1$, $600_2$, $600_3$, 67 total elements (data elements 602 (64 data elements), 604a, 604c, and 604e (3 servo element pairs)) are wired and operational, where the $33^{rd}$ data element 602 and the second, fourth, and sixth (if included) servo element pairs 604b, 604d, and 604f (if included) are not wired. In FIG. 7B, the data elements 602 in the first tape head module $600_1$ are write elements (left writers (LW)), the data elements 602 in the second tape head module $600_2$ are read elements (center readers (CR)), and the data elements 602 in the third tape head module $600_3$ are write elements (right writers (RW)). The second and third tape head modules $600_2$, $600_3$ are rotated about 180 degrees from the first tape head module $600_1$ such that the data elements 602 of the first tape head module $600_1$ face the data elements 602 of the second tape head module $600_2$, and the servo element pairs 604a-604f of the second tape head module $600_2$ face the data elements 602 of the third tape head module $600_3$.

FIG. 7C illustrates three tape head modules $600_1$, $600_2$, $600_3$, each tape head module $600_1$, $600_2$, $600_3$ being in the third configuration 600C and may or may not comprise the optional sixth servo element pair 604f. In each tape head module, the 32 data elements in the center are wired and operational. On the servo side, only servo element pairs 604b and 604d are wired and operational out of the 5 or 6 possible servo element pairs 604 fabricated (depending on whether servo element pair 604f is fabricated). Similar to FIG. 7B, in FIG. 7C, the data elements 602 in the first tape head module $600_1$ are write elements (left writers (LW)), the data elements 602 in the second tape head module $600_2$ are read elements (center readers (CR)), and the data elements 602 in the third tape head module $600_3$ are write elements (right writers (RW)). The second and third tape head modules $600_2$, $600_3$ are rotated about 180 degrees from the first tape head module $600_1$ such that the data elements 602 of the first tape head module $600_1$ face the data elements 602 of the second tape head module $600_2$, and the servo element pairs 604a-604f of the second tape head module $600_2$ face the data elements 602 of the third tape head module $600_3$.

FIG. 7D illustrates three tape head modules $600_1$, $600_2$, $600_3$, each tape head module $600_1$, $600_2$, $600_3$ being in a fourth configuration 700 that is similar to the third configuration 600C, and comprising the sixth servo element pair 604f. In each tape head module, the 32 data elements in the center are wired and operational. On the servo side, servo element pairs 604b and 604f are wired and operational (of the 6 servo element pairs fabricated). Similar to FIGS. 7B and 7C, in FIG. 7D, the data elements 602 in the first tape head module $600_1$ are write elements (left writers (LW)), the data elements 602 in the second tape head module $600_2$ are read elements (center readers (CR)), and the data elements 602 in the third tape head module $600_3$ are write elements (right writers (RW)). The second and third tape head modules $600_2$, $600_3$ are rotated about 180 degrees from the first tape head module $600_1$ such that the data elements 602 of the first tape head module $600_1$ face the data elements 602 of the second tape head module $600_2$, and the servo element pairs 604a-604f of the second tape head module $600_2$ face the data elements 602 of the third tape head module $600_3$.

The fourth configuration 700 is similar to the third configuration 600C; however, the fourth configuration utilizes the sixth servo element pairs 604f of the second and third tape head modules $600_2$, $600_3$ in place of the fourth servo element pair 604d, allowing the tape head modules $600_1$, $600_2$, $600_3$ to be retrofitted in current tape drives, such as linear tape open (LTO) tape drives (i.e., backwards compatibility). As such, one or more tape head modules 600 comprising 65 data elements and 6 servo element pairs may be utilized within pre-existing tape drives.

By including 65 data elements and either 5 or 6 servo element pairs in a tape head module, more channels or data tracks of a tape can be written and read to. As such, the overall data rate of the tape drive comprising the 65 channel tape head module(s) is increased, and the overall writing and reading speed is increased as well.

In one embodiment, a tape head module comprises 65 data elements disposed in a first row, each data element being a write element or a read element, and at least 5 servo element pairs disposed in a second row, the second row being disposed parallel to the first row, wherein the second row is spaced a distance in a first direction from the first row. A first servo element pair of the at least 5 servo element pairs is disposed adjacent to a first data element of the 65 data elements, the first servo element pair being offset in a second direction perpendicular to the first direction from the first data element. A second servo element pair of the at least 5 servo element pairs is disposed adjacent to a 16th data element of the 65 data elements, a third second servo element pair of the at least 5 servo element pairs is disposed adjacent to a 33rd data element of the 65 data elements, and a fourth second servo element pair of the at least 5 servo element pairs is disposed adjacent to a 49th data element of the 65 data elements. A fifth servo element pair of the at least 5 servo element pairs is disposed adjacent to a 65th data element of the 65 data elements, the fifth servo element pair being offset in the second direction perpendicular to the first direction from the 65th data element. The distance is about 0.5 μm to about 2 μm, and wherein each servo element pair is spaced a second distance of about 2740 μm to about 2760 μm from an adjacent servo element pair. One or more data elements of the 65 data elements are unwired. One or more servo element pairs of the at least 5 servo element pairs are unwired. A tape drive comprises the tape head module.

In another embodiment, a tape drive comprises a first tape head module, the first tape head module comprising: 65 data elements disposed in a first row, each data element being a write element or a read element, wherein one or more data elements of the 65 data elements are unwired, and at least 5 servo element pairs disposed in a second row, the second row being disposed parallel to the first row, wherein the second row is spaced a first distance in a first direction from the first row, wherein one or more servo element pairs of the at least 5 servo element pairs are unwired, and wherein at least 2 of the at least 5 servo element pairs are spaced a second distance of at least one-fifth of a distance that spans the first row of 65 data elements from an adjacent servo element pair.

Each data element is spaced a third distance of about 83.25 μm from an adjacent data element, and wherein the first distance is about 0.5 μm to about 2 μm. A first servo element pair of the at least 5 servo element pairs is offset in a second direction perpendicular to the first direction with a first data element of the 65 data elements, and wherein a second servo element pair of the at least 5 servo element pairs is aligned in the second direction with a 16th data element of the 65 data elements. A $33^{rd}$ data element of the 65 data elements is unwired, and wherein the second servo element pair of the at least 5 servo element pairs and the fourth servo element pair of the at least 5 servo element pairs are unwired.

The tape drive further comprises a second tape head module disposed adjacent to the first tape head module, and a third tape head module disposed adjacent to the second tape head module, wherein the second tape head module and the third tape head module each individually comprises: 65 data elements disposed in a first row, each data element being a write element or a read element, and at least 5 servo element pairs disposed in a second row, the second row being disposed parallel to the first row, wherein the second row is spaced the first distance in the first direction from the first row. Each data element of the first tape head module is a write element, wherein each data element of the second tape head module is a read element, and wherein each data element of the third tape head module is a write element.

In yet another embodiment, a tape drive comprises a first tape head module, a second tape head module disposed adjacent to the first tape head module, and a third tape head module disposed adjacent to the second tape head module, wherein the first tape head module, the second tape head module, and the third tape head module each individually comprises: 65 data elements disposed in a first row, each data element being a write element or a read element, wherein one or more data elements of the 65 data elements are unwired, and at least 5 servo element pairs disposed in a second row, the second row being disposed parallel to the first row, wherein the second row is spaced a first distance of about 0.5 μm to about 2 μm in a first direction from the first row, wherein one or more servo element pairs of the at least 5 servo element pairs are unwired, and wherein each servo element pair is spaced a second distance of at least one-fifth of a distance that spans the first row of 65 data elements from an adjacent servo element pair.

Each data element of the first tape head module is a write element, wherein each data element of the second tape head module is a read element, and wherein each data element of the third tape head module is a write element. Each data element of the first tape head module is a read element, wherein each data element of the second tape head module is a write element, and wherein each data element of the third tape head module is a read element. A $33^{rd}$ data element of the 65 data elements is unwired, and wherein the second servo element pair of the at least 5 servo element pairs and the fourth servo element pair of the at least 5 servo element pairs are unwired. A first data element through a 16th data element of the 65 data elements are unwired, a 17th data element through a 48th data element are wired, a 49th data element through a 65th data element of the 65 data elements are unwired. A first servo element pair of the at least 5 servo element pairs, a third servo element pair of the at least 5 servo element pairs, and a fifth servo element pair of the at least 5 servo element pairs are unwired. The tape drive further comprises a sixth servo element pair disposed in the second row.

While the foregoing is directed to embodiments of the present disclosure, other and further embodiments of the disclosure may be devised without departing from the basic scope thereof, and the scope thereof is determined by the claims that follow.

What is claimed is:

1. A tape head module, comprising:
    65 data elements disposed in a first row, each data element being a write element or a read element; and
    at least 5 servo element pairs disposed in a second row, the second row being disposed parallel to the first row, wherein the second row is spaced a distance in a first direction from the first row, wherein a first servo element pair of the at least 5 servo element pairs is disposed adjacent to a first data element of the 65 data elements, the first servo element pair being offset in a second direction perpendicular to the first direction from the first data element, and wherein a second servo element pair of the at least 5 servo element pairs is disposed adjacent to a 16th data element of the 65 data elements, a third servo element pair of the at least 5 servo element pairs is disposed adjacent to a 33rd data element of the 65 data elements, and a fourth servo element pair of the at least 5 servo element pairs is disposed adjacent to a 49th data element of the 65 data elements.

2. The tape head module of claim 1, wherein a fifth servo element pair of the at least 5 servo element pairs is disposed adjacent to the 65th data element of the 65 data elements, the fifth servo element pair being offset in the second direction perpendicular to the first direction from the 65th data element.

3. The tape head module of claim 1, wherein the distance is about 0.5 μm to about 2 μm, and wherein each servo element pair is spaced a second distance of about 2740 μm to about 2760 μm from an adjacent servo element pair.

4. The tape head module of claim 1, wherein one or more data elements of the 65 data elements are unwired.

5. The tape head module of claim 1, wherein one or more servo element pairs of the at least 5 servo element pairs are unwired.

6. A tape drive comprising the tape head module of claim 1.

7. A tape drive, comprising:
    a first tape head module, the first tape head module comprising:
        65 data elements disposed in a first row, each data element being a write element or a read element, wherein one or more data elements of the 65 data elements are unwired; and
        at least 5 servo element pairs disposed in a second row, the second row being disposed parallel to the first row, wherein the second row is spaced a first distance in a first direction from the first row, wherein one or more servo element pairs of the at least 5 servo element pairs are unwired, and wherein at least 2 of the at least 5 servo element pairs are spaced a second distance of at least one-fifth of a distance that spans the first row of 65 data elements from an adjacent servo element pair.

8. The tape drive of claim 7, wherein each data element is spaced a third distance of about 83.25 μm from an adjacent data element, and wherein the first distance is about 0.5 μm to about 2 μm.

9. The tape drive of claim 7, wherein a first servo element pair of the at least 5 servo element pairs is offset in a second direction perpendicular to the first direction with a first data element of the 65 data elements, and wherein a second servo element pair of the at least 5 servo element pairs is aligned in the second direction with a 16th data element of the 65 data elements.

10. The tape drive of claim 7, wherein a 33rd data element of the 65 data elements is unwired, and wherein a second servo element pair of the at least 5 servo element pairs and a fourth servo element pair of the at least 5 servo element pairs are unwired.

11. The tape drive of claim 7, further comprising:
a second tape head module disposed adjacent to the first tape head module; and
a third tape head module disposed adjacent to the second tape head module, wherein the second tape head module and the third tape head module each individually comprises:
65 data elements disposed in a first row, each data element being a write element or a read element; and
at least 5 servo element pairs disposed in a second row, the second row being disposed parallel to the first row, wherein the second row is spaced the first distance in the first direction from the first row.

12. The tape drive of claim 11, wherein each data element of the first tape head module is a write element, wherein each data element of the second tape head module is a read element, and wherein each data element of the third tape head module is a write element.

13. A tape drive, comprising:
a first tape head module;
a second tape head module disposed adjacent to the first tape head module; and
a third tape head module disposed adjacent to the second tape head module, wherein the first tape head module, the second tape head module, and the third tape head module each individually comprises:
65 data elements disposed in a first row, each data element being a write element or a read element, wherein one or more data elements of the 65 data elements are unwired; and
at least 5 servo element pairs disposed in a second row, the second row being disposed parallel to the first row, wherein the second row is spaced a first distance of about 0.5 µm to about 2 µm in a first direction from the first row, wherein one or more servo element pairs of the at least 5 servo element pairs are unwired, and wherein each servo element pair is spaced a second distance of at least one-fifth of a distance that spans the first row of 65 data elements from an adjacent servo element pair.

14. The tape drive of claim 13, wherein each data element of the first tape head module is a write element, wherein each data element of the second tape head module is a read element, and wherein each data element of the third tape head module is a write element.

15. The tape drive of claim 13, wherein each data element of the first tape head module is a read element, wherein each data element of the second tape head module is a write element, and wherein each data element of the third tape head module is a read element.

16. The tape drive of claim 13, wherein a $33^{rd}$ data element of the 65 data elements is unwired, and wherein a second servo element pair of the at least 5 servo element pairs and a fourth servo element pair of the at least 5 servo element pairs are unwired.

17. The tape drive of claim 13, wherein a first data element through a 16th data element of the 65 data elements are unwired, a 17th data element through a 48th data element are wired, a 49th data element through a 65th data element of the 65 data elements are unwired.

18. The tape drive of claim 17, wherein a first servo element pair of the at least 5 servo element pairs, a third servo element pair of the at least 5 servo element pairs, and a fifth servo element pair of the at least 5 servo element pairs are unwired.

19. The tape drive of claim 13, further comprising a sixth servo element pair disposed in the second row.

* * * * *